United States Patent
Abraham et al.

(10) Patent No.: US 9,237,585 B2
(45) Date of Patent: Jan. 12, 2016

(54) ACCESS POINT SCHEDULED PEER-TO-PEER COMMUNICATION

(71) Applicant: QUALCOMM Incorporated, San Diego, CA (US)

(72) Inventors: Santosh Paul Abraham, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 13/713,097

(22) Filed: Dec. 13, 2012

(65) Prior Publication Data
US 2013/0121227 A1   May 16, 2013

Related U.S. Application Data

(62) Division of application No. 12/649,426, filed on Dec. 30, 2009.

(60) Provisional application No. 61/255,993, filed on Oct. 29, 2009.

(51) Int. Cl.
*H04W 74/00* (2009.01)
*H04W 74/02* (2009.01)
*H04W 52/02* (2009.01)
(Continued)

(52) U.S. Cl.
CPC .......... *H04W 74/06* (2013.01); *H04W 52/0222* (2013.01); *H04W 72/12* (2013.01); *H04W 72/1289* (2013.01); *H04W 74/02* (2013.01);
(Continued)

(58) Field of Classification Search
CPC ............ H04W 74/0816; H04W 72/12; H04W 76/023; H04W 74/06; H04W 52/0222; H04W 74/02
USPC ........................................................ 370/431
See application file for complete search history.

(56) References Cited

U.S. PATENT DOCUMENTS

2005/0135284 A1   6/2005   Nanda et al.
2005/0135416 A1   6/2005   Ketchum et al.
(Continued)

FOREIGN PATENT DOCUMENTS

CN    101364912 A    2/2009
CN    101390326 A    3/2009
(Continued)

OTHER PUBLICATIONS

IEEE 802.11 Working Group, "Draft Standard for Information Technology—Telecommunications and information exchange between systems—Local and metropolitan area networks—Specific requirements—Part 11: Wireless LAN Medium Access Control (MAC) and Physical Layer (PHY) specifications Amendment 6: Extensions to Direct Link Setup", P802.11Z/D6.0, Aug. 1, 2009, pp. 1-67, XP002617694, IEEE, Piscataway, NJ, US.
(Continued)

*Primary Examiner* — Omer S Mian
(74) *Attorney, Agent, or Firm* — Steven R. Thiel

(57) ABSTRACT

Certain aspects of the present disclosure relate to a technique for scheduling multiple peer-to-peer communications in a wireless network using an access point (AP). The existing power management framework for AP-based communications is utilized to achieve AP-based scheduling of peer-to-peer communications.

26 Claims, 6 Drawing Sheets

(51) Int. Cl.
    *H04W 74/06*     (2009.01)
    *H04W 76/02*     (2009.01)
    *H04W 72/12*     (2009.01)
    *H04W 74/08*     (2009.01)

(52) U.S. Cl.
    CPC ........ *H04W 74/0816* (2013.01); *H04W 76/023* (2013.01)

(56) References Cited

U.S. PATENT DOCUMENTS

| | | |
|---|---|---|
| 2005/0152291 A1 | 7/2005 | Al-Harthi |
| 2005/0157674 A1 | 7/2005 | Wentink |
| 2006/0215601 A1 | 9/2006 | Vleugels et al. |
| 2007/0104214 A1* | 5/2007 | Hsieh et al. .................. 370/458 |
| 2007/0201467 A1 | 8/2007 | Kakani |
| 2007/0226351 A1* | 9/2007 | Fischer et al. ................ 709/227 |
| 2008/0095091 A1 | 4/2008 | Surineni et al. |
| 2009/0046681 A1 | 2/2009 | Kalogridis et al. |
| 2009/0124301 A1 | 5/2009 | Raissinia |
| 2009/0225706 A1 | 9/2009 | Ramachandran et al. |
| 2009/0274167 A1 | 11/2009 | Yamazaki et al. |
| 2010/0061334 A1* | 3/2010 | Gault et al. .................. 370/330 |
| 2010/0189046 A1 | 7/2010 | Baker et al. |
| 2011/0103319 A1 | 5/2011 | Abraham et al. |
| 2011/0128900 A1* | 6/2011 | Seok ........................... 370/311 |

FOREIGN PATENT DOCUMENTS

| | | |
|---|---|---|
| CN | 101472319 A | 7/2009 |
| JP | 2007295541 A | 11/2007 |
| WO | 2007007760 A1 | 1/2007 |
| WO | 2008036311 A2 | 3/2008 |
| WO | 2010082084 A1 | 7/2010 |

OTHER PUBLICATIONS

IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications; IEEE Std 802.11-2007 (Revision of IEEE Std 802.1, IEEE Standard; [IEEE Standard], IEEE, Piscataway, NJ, USA, Jun. 12, 2007, pp. C1-1184, XP017604022,ISBN: 978-0-7381-5656-9.
International Preliminary Report on Patentability—PCT/US2010/054746, The International Bureau of WIPO—Geneva, Switzerland, Jan. 23, 2012.
International Search Report and Written Opinion—PCT/US2010/054746, International Search Authority—European Patent Office—Feb. 9, 2011.
Devinator., "Power Save Multi-Poll (PSMP)", CWNP (Certified Wireless Security Professional), Sep. 14, 2007.

\* cited by examiner

ACCESS POINT SCHEDULED PEER-TO-PEER COMMUNICATION

CLAIM OF PRIORITY UNDER 35 U.S.C. §119

The present Application for Patent is a Divisional of U.S. patent application Ser. No. 12/649,426 entitled "ACCESS POINT SCHEDULED PEER-TO-PEER COMMUNICATION," filed Dec. 30, 2009, which claims benefit of Provisional Application Ser. No. 61/255,993 filed Oct. 29, 2009, and assigned to the assignee hereof and hereby expressly incorporated by reference herein.

BACKGROUND

1. Field

Certain aspects of the present disclosure generally relate to a wireless communication and, more particularly, to scheduling of peer-to-peer communication.

2. Background

In order to transmit data between two user stations (STAs) (e.g., STA1 and STA2) that are associated with one access point (AP), two approaches are generally available. In one approach, the STA1 can send data to the AP, and then the AP forwards the data to the STA2. In another approach, the STA1 sets up a Direct Link Setup (DLS) connection with the STA2. Messages for DLS are forwarded through the AP. Once the DLS connection is set up, the STA1 can directly send data packets to the STA2.

Currently, frames that are conveyed using DLS have to be sent using Carrier Sense Multiple Access (CSMA) based contention protocol. However, in scenarios where there are several DLS connections, significant collisions may arise which can diminish throughputs for the multiple DLS streams.

SUMMARY

Certain aspects provide a method for wireless communications. The method generally includes determining a schedule for multiple communications between apparatuses, wherein the schedule indicates a time period for a first apparatus to transmit and the same time period for a second apparatus to receive, and transmitting the schedule to the first and second apparatuses.

Certain aspects provide an apparatus for wireless communications. The apparatus generally includes a circuit configured to determine a schedule for multiple communications between apparatuses, wherein the schedule indicates a time period for a first apparatus to transmit and the same time period for a second apparatus to receive, and a transmitter configured to transmit the schedule to the first and second apparatuses.

Certain aspects provide an apparatus for wireless communications. The apparatus generally includes means for determining a schedule for multiple communications between apparatuses, wherein the schedule indicates a time period for a first apparatus to transmit and the same time period for a second apparatus to receive, and means for transmitting the schedule to the first and second apparatuses.

Certain aspects provide a computer-program product for wireless communications. The computer-program product includes a computer-readable medium comprising instructions executable to determine a schedule for multiple communications between apparatuses, wherein the schedule indicates a time period for a first apparatus to transmit and the same time period for a second apparatus to receive, and transmit the schedule to the first and second apparatuses.

Certain aspects provide an access point. The access point generally includes at least one antenna, a circuit configured to determine a schedule for multiple communications between wireless nodes, wherein the schedule indicates a time period for a first wireless node to transmit and the same time period for a second wireless node to receive, and a transmitter configured to transmit via the at least one antenna the schedule to the first and second wireless nodes.

Certain aspects provide a method for wireless communications. The method generally includes receiving, at a first apparatus, a control message, the control message indicating a time period for communications, identifying a second apparatus assigned the same time period for communications, and communicating with the second apparatus during the time period.

Certain aspects provide an apparatus for wireless communications. The apparatus generally includes a receiver configured to receive a control message, the control message indicating a time period for communications, a circuit configured to identify another apparatus assigned the same time period for communications, and a transceiver configured to communicate with the other apparatus during the time period.

Certain aspects provide an apparatus for wireless communications. The apparatus generally includes means for receiving a control message, the control message indicating a time period for communications, means for identifying another apparatus assigned the same time period for communications, and means for communicating with the other apparatus during the time period.

Certain aspects provide a computer-program product for wireless communications. The computer-program product includes a computer-readable medium comprising instructions executable to receive, at a first apparatus, a control message, the control message indicating a time period for communications, identify a second apparatus assigned the same time period for communications, and communicate with the second apparatus during the time period.

Certain aspects provide a wireless node. The wireless node generally includes at least one antenna, a receiver configured to receive via the at least one antenna a control message, the control message indicating a time period for communications, a circuit configured to identify another wireless node assigned the same time period for communications, and a transceiver configured to communicate via the at least one antenna with the other wireless node during the time period.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
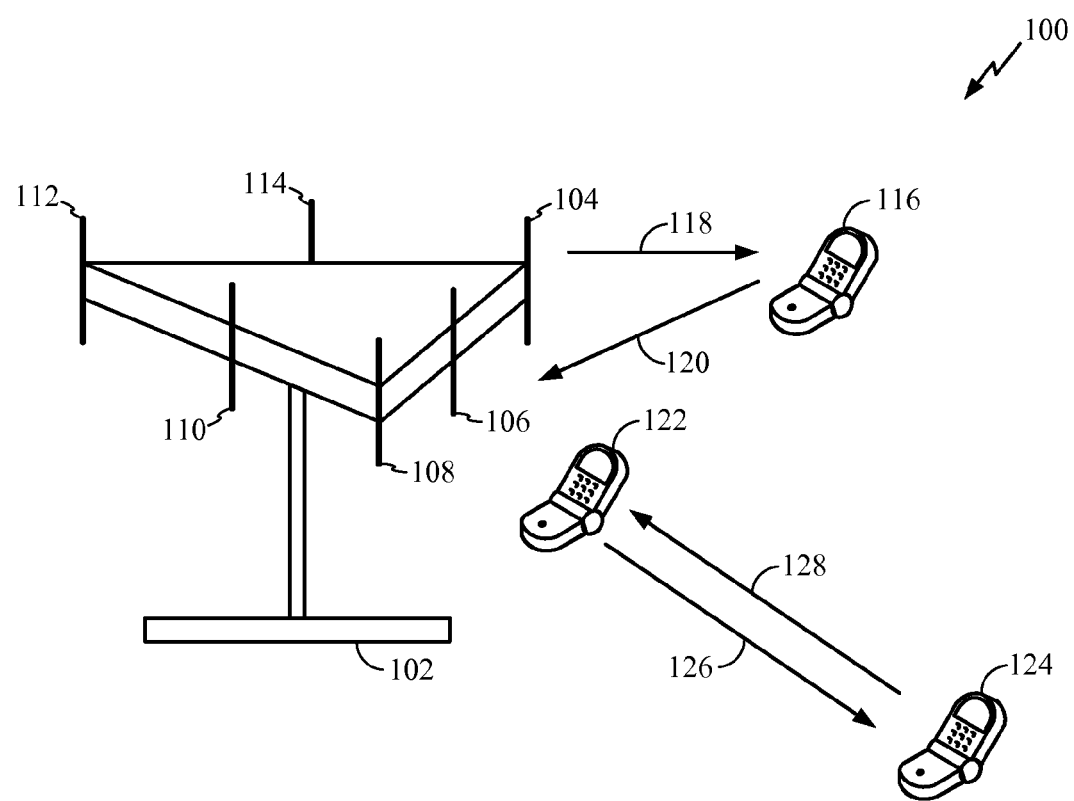
FIG. 1 illustrates an example wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One specific example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

IEEE 802.16x is an emerging standard organization to define an air interface for fixed and mobile broadband wireless access (BWA) systems. IEEE 802.16x approved "IEEE P802.16d/D5-2004" in May 2004 for fixed BWA systems and published "IEEE P802.16e/D12 October 2005" in October 2005 for mobile BWA systems. The latest revision of the IEEE 802.16, "IEEE P802.16Rev2/D9 March 2009, " a draft standard, now consolidates materials from IEEE 802.16e and corrigendum. The standards define four different physical layers (PHYs) and one medium access control (MAC) layer. The OFDM and OFDMA physical layer of the four physical layers are the most popular in the fixed and mobile BWA areas respectively.

The teachings herein may be incorporated into (e.g., implemented within or performed by) a variety of wired or wireless apparatuses (e.g., nodes). In some aspects, a node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, a headset, a sensor or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

Referring now to FIG. 1, illustrated is a wireless communication system 100 in accordance with various aspects of the present disclosure. System 100 comprises a base station (i.e., an access point) 102 that can include multiple antenna groups. For example, one antenna group can include antennas 104 and 106, another group can comprise antennas 108 and 110 and an additional group can include antennas 112 and 114. Two antennas are illustrated for each antenna group; however, more or fewer antennas can be utilized for each group. The base station 102 can additionally include a transmitter chain and a receiver chain, each of which can in turn comprise a plurality of components associated with signal transmission and reception (e.g., processors, modulators, multiplexers, demodulators, demultiplexers, antennas, and so forth), as will be appreciated by one skilled in the art. Additionally, the base station 102 can be a home base station, a Femto base station, and/or the like.

The base station 102 can communicate with one or more devices such as device 116; however, it is to be appreciated that base station 102 can communicate with substantially any number of devices similar to device 116. As depicted, device 116 is in communication with antennas 104 and 106, where antennas 104 and 106 transmit information to device 116 over a forward link 118 and receive information from device 116 over a reverse link 120. In a frequency division duplex (FDD) system, forward link 118 can utilize a different frequency band than that used by reverse link 120, for example. Further, in a time division duplex (TDD) system, forward link 118 and reverse link 120 can utilize a common frequency band.

In addition, devices 122 and 124 can be communicating with one another, such as in a peer-to-peer configuration. Moreover, device 122 is in communication with device 124 using links 126 and 128. In a peer-to-peer ad hoc network, devices within range of each other, such as devices 122 and 124, communicate directly with each other without a base station 102 and/or a wired infrastructure to relay their communication. Additionally, peer devices or nodes can relay traffic. The devices within the network communicating in a peer-to-peer manner can function similar to base stations and relay traffic or communications to other devices, functioning similar to base stations, until the traffic reaches its ultimate destination. The devices can also transmit control channels, which carry information that can be utilized to manage the data transmission between peer nodes.

A communication network can include any number of devices or nodes that are in wireless (or wired) communication. Each node can be within range of one or more other nodes and can communicate with the other nodes or through utilization of the other nodes, such as in a multi-hop topography (e.g., communications can hop from node to node until reaching a final destination). For example, a sender node may wish to communicate with a receiver node. To enable packet transfer between sender node and receiver node, one or more intermediate nodes can be utilized. It should be understood that any node can be a sender node and/or a receiver node and can perform functions of either sending and/or receiving information at substantially the same time (e.g., can broadcast or communicate information at about the same time as receiving information) or at different times.

System 100 can be configured to allow nodes that have initiated a communication session over a network to move the session to a direct connection. Nodes that are directly connected can exchange packets natively without any encapsulation. In accordance with some aspects, a "homeless" node can switch to a wireless network without losing its ongoing sessions. By "homeless" it is meant a node that does not have any home agent entity to provide assistance for keeping ongoing sessions alive while switching to foreign networks nor to forward any new incoming request(s) to establish new sessions to the node's current location. In accordance with some aspects, nodes can be mobile (e.g., wireless), static (e.g., wired), or combinations thereof (e.g., one node static and a second node mobile, both nodes mobile, and so forth).

Figure 2:
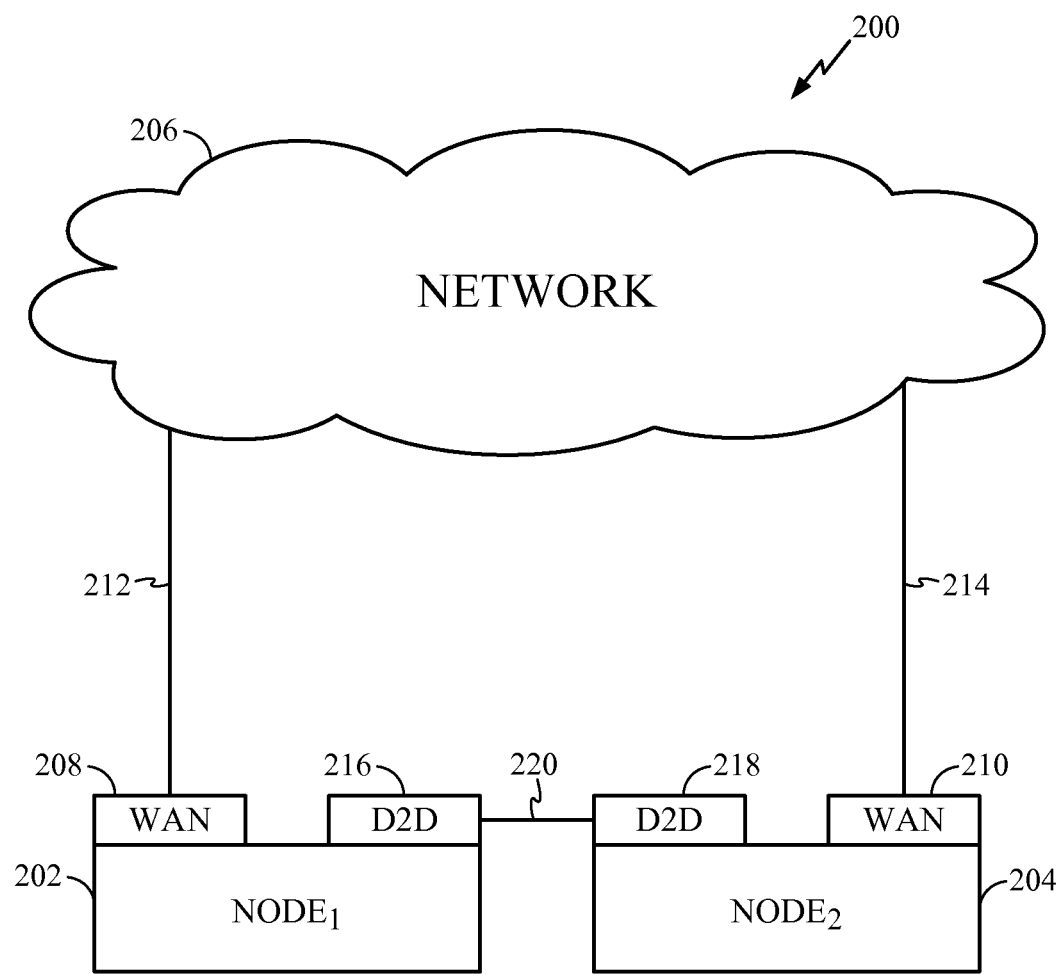
FIG. 2 illustrates a system that allows two nodes to communicate in accordance with certain aspects of the present disclosure.

FIG. 2 illustrates a system 200 that allows two nodes to communicate over a Wide Area Network interface and/or a Device to Device interface, according to various aspects. Included in the system 200 are a first node ($Node_1$) 202 and a second node ($Node_2$) 204. Each of nodes 202, 204 includes at least two interfaces. A first interface can be connected to a network 206 that provides Internet Protocol (IP) addresses. For example, the network can be a Wide Area Network (WAN), a Local Area Network (LAN), a home network, Digital Subscriber Line (DSL), cable, 3GPP based, 3GPP2 based, or any other technology providing interconnectivity and routing to a network of interest (e.g., the Internet).

Interfaces of nodes 202 and 204 can be wired (e.g., Device to Device), wireless (e.g., WAN), or combinations thereof. For example, $Node_1$ interface can be wireless and $Node_2$ interface can be wired, or $Node_2$ interface can be wireless and $Node_1$ interface can be wired, both interfaces can be wireless, or both interfaces can be wired.

For illustration purposes, the first interface of each of nodes 202, 204 is a WAN interface, 208 and 210. WAN interfaces 208, 210 provide a connection over network 206, illustrated by links 212 and 214. Further, each of nodes 202, 204 includes at least a second interface that is connected to a local network with directly connected peers or a multi-hop mesh network. For example, the local network can be a Wireless Local Area Network (WLAN) or another device to device (e.g., peer to peer) technology. For illustration purposes, the second interface of each of nodes 202, 204 is illustrated as a Device to Device (D2D) interface 216, 218. The D2D interfaces 216, 218 allow nodes 202, 204 to perform direct communications, illustrated by direct link 220.

A procedure according to various aspects for starting a session over network 206 and moving to a direct session (e.g., over direct link 220) will now be described. For example purposes, it is assumed that $Node_1$ 202 utilizes Mobile Internet Protocol. Communications are performed by $Node_1$ 202 utilizing its Mobile IP home address as a source address. A home address is a unicast routable address assigned to a node and is used as the permanent address of the node. $Node_1$ 202 communicates with $Node_2$ 204 over network 206 (e.g., WAN) by sending and receiving packets over respective first interfaces (e.g., WAN interfaces 208, 210). The packets can be encapsulated in a MIPv6 tunnel to a home agent, which can be included in network 206 according to various aspects, or a route optimization tunnel directly to $Node_2$ 204.

Figure 3:
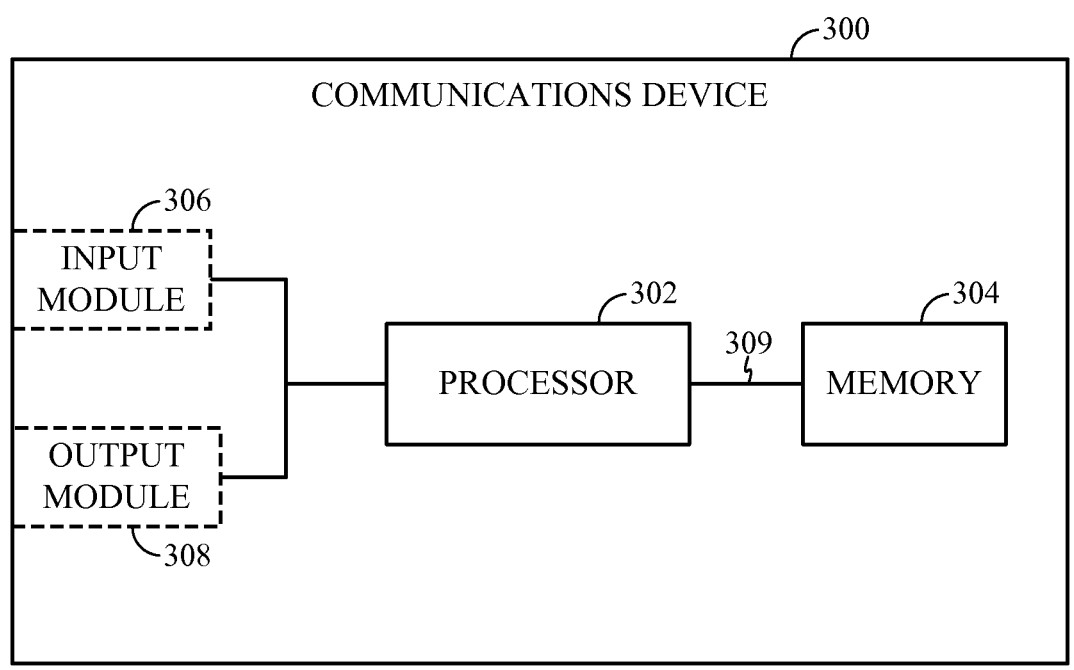
FIG. 3 illustrates an example of a communication device in accordance with certain aspects of the present disclosure.

FIG. 3 illustrates an exemplary first communications device 300, in accordance with an exemplary aspect. Exemplary first communications device 300 is, e.g., one of the wireless communications devices (102, 116, 122, 124) of FIG. 1 or one of the wireless communications devices (202, 204) of FIG. 2.

First communications device 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some aspects, the input module 306 and output module 308 are located internal to the processor 302. Input module 306 can receive input signals. Input module 306 can, and in some aspects does, include a wireless receiver and/or a wired or optical input interface for receiving input. Output module 308 may include, and in some aspects does include, a wireless transmitter and/or a wired or optical output interface for transmitting output.

Processor 302 is configured to: receive a first signal from a second communications device; generate a first application alert if said first signal satisfies an application alert criteria; and receive a second signal from an access point said second signal carrying second communications device information based on a previous signal from the second communications device. The access point may be, and sometimes is, a base station. In some aspects, the second communications device information is location information. In various aspects, processor 302 is configured to receive said first signal via a wireless peer to peer interface as part of being configured to receive a first signal. In some aspects, processor 302 is configured to receive the second signal via a wireless wide area network interface as part of being configured to receive the second signal.

Processor 302 is further configured to determine an operation to take based on the second communications device information included in the second signal and information included in said first signal. In one exemplary aspect, said second communications device information included in the second signal is information on a previous location of said second communications device, said information included in the first signal is current location information, and said operation is one of a location based traffic update operation and a location based advertisement update operation. Processor 302, in some aspects, is further configured to send an information request signal to the access point requesting information corresponding to the second communications device, in response to the generated first application alert.

Certain aspects of the present disclosure support utilizing a power management framework (e.g., Power Save Multi Poll (PSMP) frames) for AP-based scheduling of peer-to-peer communications, such as communications between the wireless nodes 202 and 204 illustrated in FIG. 2. The PSMP frames are utilized in the art only for communications between an access point and a user station.

Scheduling of Peer-to-Peer Transactions

Figure 4:
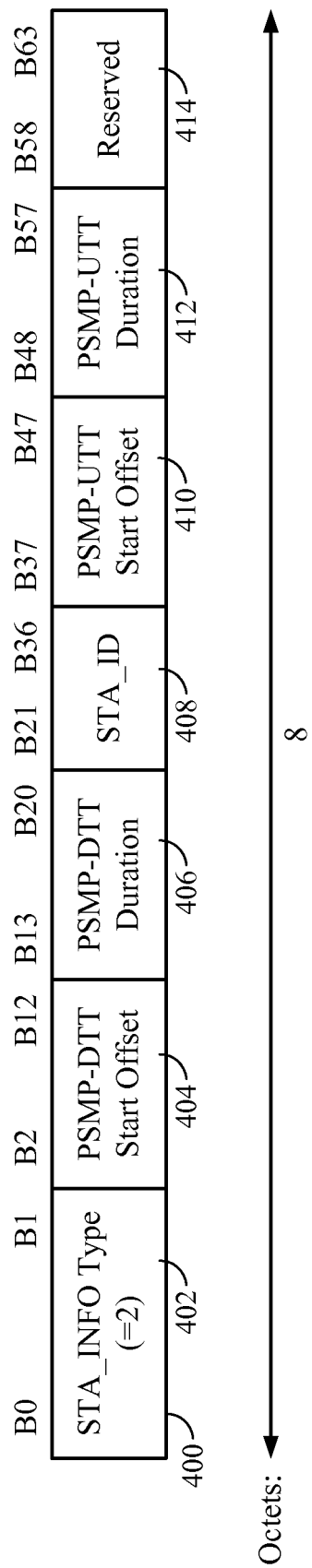
FIG. 4 illustrates an example information field within a Power Save Multi Poll (PSMP) frame used for scheduling peer-to-peer (P2P) communications in accordance with certain aspects of the present disclosure

FIG. 4 illustrates an example information field 400 within a PSMP frame in accordance with certain aspects of the present disclosure. The PSMP frame may be addressed to a group address and may carry several station-information (STA-info) fields, one for each user station (STA) that may be transmitting and/or receiving data.

Different fields of the STA-info field 400 may have different functions. A station-identification (STA-ID) field 408 may identify the STA associated with the STA-info field 400. A PSMP Downlink Transmission Time (DTT) Start Offset field 404 may identify a start time for reception at the STA, and a PSMP-DTT Duration field 406 may identify duration for reception at the STA. On the other hand, a PSMP Uplink Transmission Time (UTT) Start Offset field 410 may indentify a time of transmission from the STA, and a PSMP-UTT Duration field 412 may identify duration of time allowed for transmission from the STA.

Each STA may need to know exactly when to transmit and receive, as well as to know an identity of a peer node. It is proposed in the present disclosure to extend the capabilities of the PSMP message to accommodate peer-to-peer transmissions. In one aspect of the present disclosure, the value of STA-info type field 402 may be set to a defined value (e.g., the value of three) indicating that the STA-info field 400 is dedicated for STA-to-STA transmission based on Direct Link Setup (DLS) connection. Reserved bits 414 may be utilized to define a channel for the STA-to-STA DLS transmission. Transmission channels may be switched by changing the value of reserved bits 414.

When a STA receives the PSMP message from the AP, the STA may scan through the message in order to find an STA-info field for itself. From the STA-info type field the STA may identify the type of allocation, i.e., AP-STA communication or DLS communication. If the STA-info field associated with a STA (e.g., STA1) is identified for DLS communication, then the STA1 may search through the PSMP message for one or more potential destinations for this DLS communication.

Once the potential destinations (e.g., STA2 and STA3) have been identified, the STA1 may determine if there is an STA-info field for STA2 and/or STA3 whose PSMP-DTT Start Offset and PSMP-DTT Duration match the STA1's PSMP-UTT Start Offset and PSMP-UTT Duration. If the STA1 finds a matching STA-info field that is associated with, for example, the STA2, then the STA1 may begin transmitting data to the STA2 at the allocated offset and for the allocated time duration.

The PSMP frame may be also utilized to indicate a channel switch by employing, for example, three bits out of six-bit reserved fields, such as the reserved field 414 of the STA-info field 400. If, for example, four contiguous 20 MHz channels are available to the AP, then different three-bit patterns may indicate different combinations of one or more 20 MHz channels. It should be noted that if a channel switch option is available, then the STA1 may also need to match the transmission channel with one or more other peers in addition to the offset and duration fields.

It should be noted the STA may be able to operate in a sleep mode during any time period defined in the PSMP frame. Furthermore, the STA may be able to access a wireless channel for any transmission that does not interfere with the transmissions established by the PSMP frame, wherein that wireless channel may not be indicated in the PSMP frame. For example, the STA may contend in the wireless channel not being covered by the PSMP message.

Figure 5:
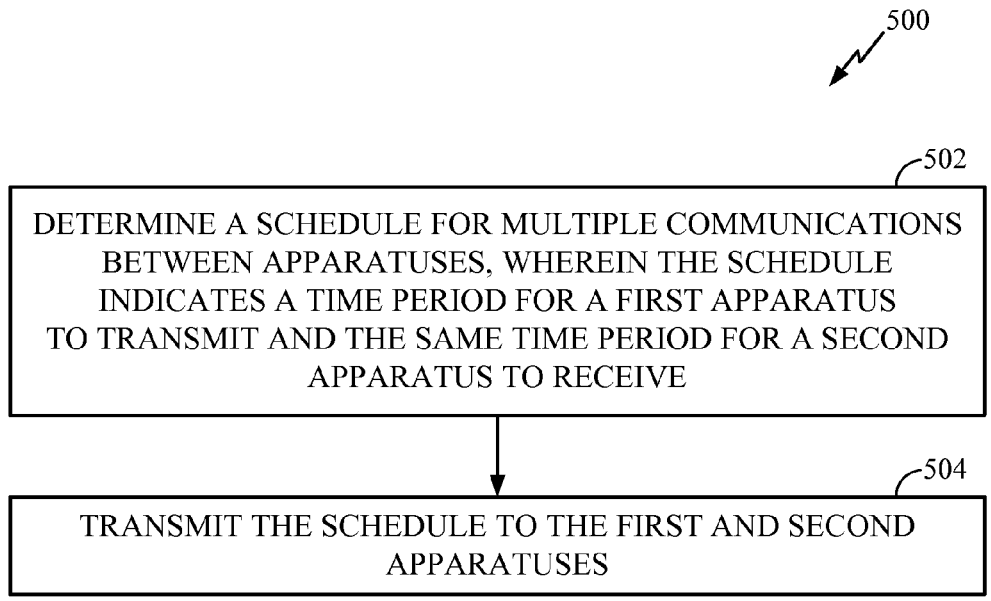
FIG. 5 illustrates example operations executed at an access point for scheduling peer-to-peer (P2P) communications in accordance with certain aspects of the present disclosure.

FIG. 5 illustrates example operations 500 executed at an AP for scheduling multiple communications in accordance with certain aspects of the present disclosure. At 502, the AP may determine a schedule for the multiple communications between apparatuses, wherein the schedule indicates a time period for a first apparatus (i.e., a peer node) to transmit and the same time period for a second apparatus (i.e., another peer node) to receive. At 504, the AP may transmit the schedule to the first and second apparatuses. The multiple communications may comprise multiple DLS communications established between pairs of the apparatuses (i.e., between peer nodes).

Figure 6:
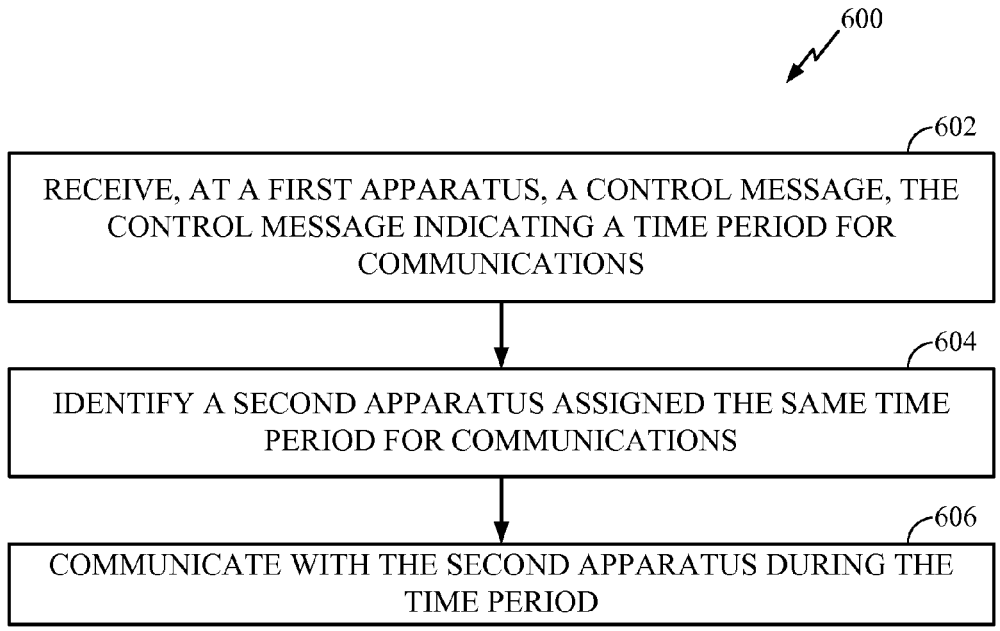
FIG. 6 illustrates example operations executed at a wireless node for establishing the P2P communications with a peer node in accordance with certain aspects of the present disclosure.

FIG. 6 illustrates example operations 600 executed at the first apparatus for establishing communications with the second apparatus in accordance with certain aspects of the present disclosure. At 602, the first apparatus may receive a control message, the control message indicating a time period for communications. At 604, the second apparatus with the assigned same time period for communications may be identified. At 606, the first apparatus may communicate with the second apparatus during the time period.

Initiating AP-Scheduled Peer-to-Peer Transactions

In order for an access point to schedule one or more peer-to-peer transactions, the access point may need to be aware of the backlogged peer-to-peer traffic at STAs. Several methods are proposed in the present disclosure for providing the AP with the backlog information.

In one aspect of the present disclosure, the AP may listen to DLS data traffic to determine backlog information, where the determined backlog information may be used to schedule future DLS data traffic transfers. In another aspect, the AP may schedule transmission times of requests for DLS transmissions using a deterministic back-off procedure. The AP may send out a message with a back-off count for a subset of DLS-capable STAs, and then it may wait for the responses related to peer-to-peer buffer levels. In yet another aspect, the AP may utilize Traffic Specification (TSPEC) information of the DLS flow to determine how often a particular DLS flow may need to be scheduled.

Figure 5A:
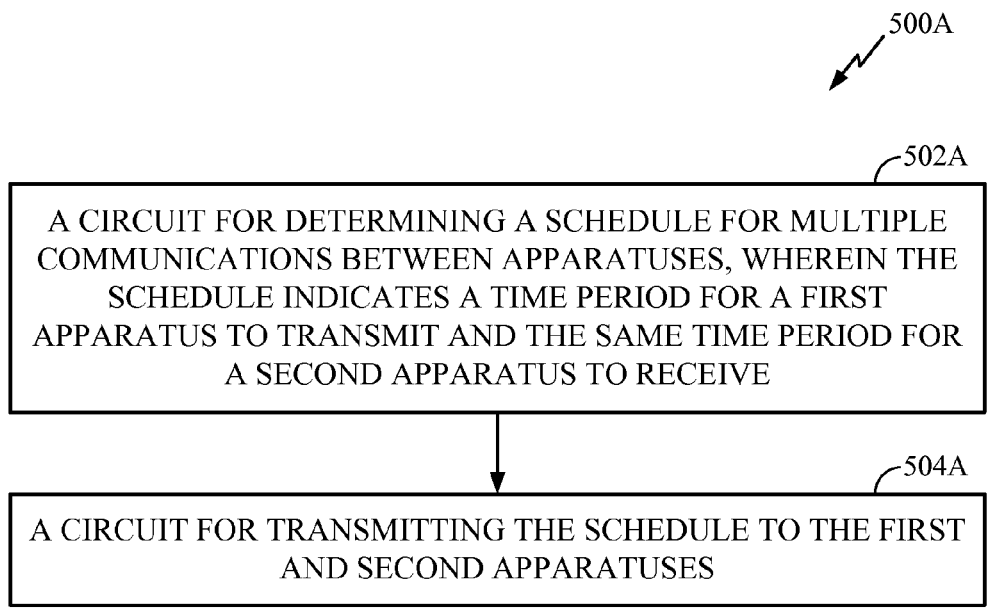
FIG. 5A illustrates example components capable of performing the operations illustrated in FIG. 5.
Figure 6A:
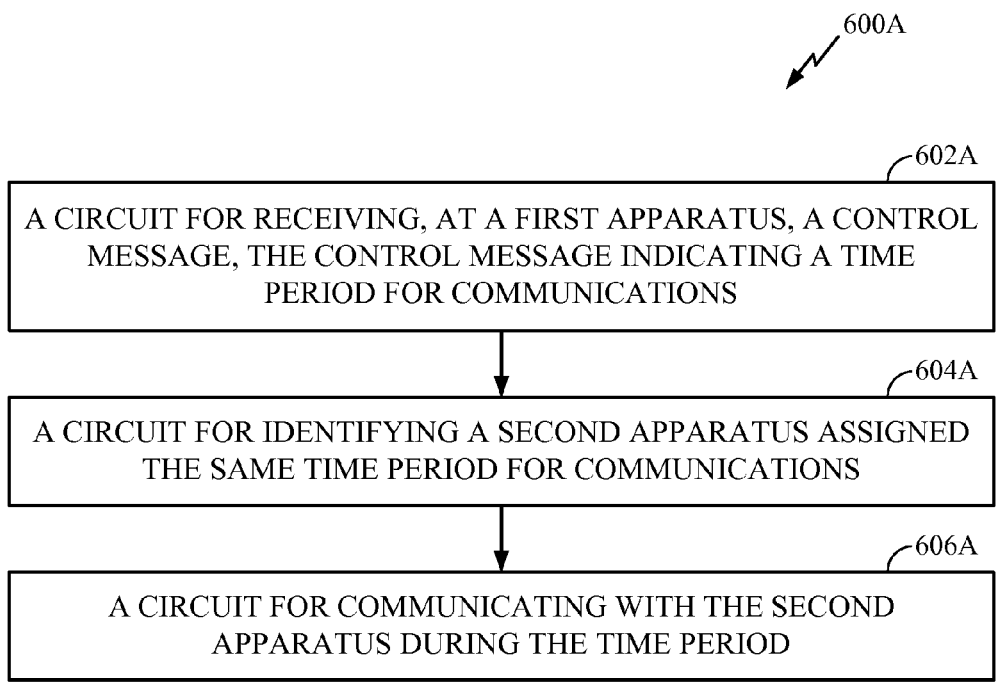
FIG. 6A illustrates example components capable of performing the operations illustrated in FIG. 6.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 502-504 and 602-606 illustrated in FIG. 5 and FIG. 6, correspond to circuit blocks 502A-504A and 602A-606A illustrated in FIG. 5A and FIG. 6A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. The various illustrative circuits described in connection with the present disclosure may be also implemented to comprise hardware component(s), software component(s), firmware component(s), or any combination thereof.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable.

For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method for wireless communications, comprising:
receiving, at a first apparatus, a schedule for multiple communications between a plurality of apparatuses in a first station-information (STA-info) field and second station-information (STA-info) field of a Power Save Multi Poll (PSMP) frame, wherein the schedule comprises:
for a first apparatus among the plurality of apparatuses, within the first STA-info field:
a first field indicating a first time period to transmit at least one data packet,
a second field, separate from the first field, indicating an identification of the first apparatus, and
a third field, separate from the first and second fields, indicating that the first apparatus must communicate using peer-to-peer communication; and
for a second apparatus different from the first apparatus, within the second STA-info field:
a fourth field, separate from the first, second and third fields, indicating a second time period to receive said at least one data packet;
scanning, by the first apparatus, through the PSMP frame to determine the first STA-info field associated with the first apparatus based on the second field;
determining, by the first apparatus and based on the third field, that the transmission of said at least one data packet is by peer-to-peer communication;
determining the second apparatus as a destination of the said at least one data packet based on (i) the third field and (ii) the first time period and the second time period being the same; and
performing the transmission of said at least one data packet to the second apparatus.

2. The method of claim 1, wherein the peer-to-peer communications comprises a Direct Link Setup (DLS) communication.

3. The method of claim 1, wherein the PSMP frame comprises the IEEE 802.11n PSMP message.

4. The method of claim 1, wherein scanning through the PSMP frame comprises determining the identification of the first apparatus, wherein determining the second apparatus as the destination of said at least on data packet further comprises:
scanning through the PSMP frame to identify the second STA-info field by finding a fifth field indicating an identification of the second apparatus,
determining a first value in the first STA-info field indicating a first start time for the transmission of said at least one data packet from the first apparatus and a second value in the second STA-info field indicating a second start time for the reception of said at least one data packet at the second apparatus being the same, and
determining a third value in the first STA-info field indicating time duration for the transmission of said at least one data packet from the first apparatus and a fourth value in the second STA-info field indicating time duration for the reception of said at least one data packet at the second apparatus being the same.

5. The method of claim 4, wherein:
the first STA-info field comprises a first sequence of bits indicating a first wireless channel for the first apparatus to use for communicating,
the second STA-info field comprises a second sequence of bits indicating a second wireless channel for the second apparatus to use for communicating, and
determining the second apparatus as a destination further comprises:
scanning through the PSMP frame to determine that the first wireless channel used by the first apparatus and the second wireless channel used by the second apparatus being the same.

6. The method of claim 1, further comprising: operating, the first apparatus, in a sleep mode during another time period that does not overlap the first time period.

7. The method of claim 1, further comprising: accessing a third wireless channel for a transmission other than the transmission of said at least one data packet, wherein the third wireless channel is a wireless channel not indicated in the PSMP frame.

8. The method of claim 7, wherein the accessing comprises contending in the third wireless channel.

9. A first apparatus for wireless communications, comprising:
a receiver configured to receive, at the first apparatus, a schedule for multiple communications between a plurality of apparatuses in a first station-information (STA-info) field and second station-information (STA-info) field of a Power Save Multi Poll (PSMP) frame, wherein the schedule comprises:
for the first apparatus among the plurality of apparatuses, within the first STA-info field:
a first field indicating a first time period to transmit at least one data packet,
a second field, separate from the first field, indicating an identification of the first apparatus, and
a third field, separate from the first and second fields, indicating that the first apparatus must communicate using peer-to-peer communication; and
for a second apparatus different from the first apparatus, within the second STA-info field:
a fourth field, separate from the first, second and third fields, indicating a second time period to receive said at least one data packet;
a circuit configured to:
scan, by the first apparatus, through the PSMP frame to determine the first STA-info field associated with the first apparatus based on the second field;
determine, by the first apparatus and based on the third field, that the transmission of said at least one data packet is by peer-to-peer communication;

determine the second apparatus as a destination of the said at least one data packet based on (i) the third field and (ii) the first time period and the second time period being the same; and a transceiver configured to perform the transmission of said at least one data packet to the second apparatus.

10. The first apparatus of claim 9, wherein the peer-to-peer communications comprises a Direct Link Setup (DLS) communication.

11. The first apparatus of claim 9, wherein the PSMP frame comprises the IEEE 802.11n PSMP message.

12. The first apparatus of claim 9, wherein scanning through the PSMP frame comprises determining the identification of the first apparatus, wherein determining the second apparatus as the destination of said at least on data packet further comprises:

the circuit further configured to:
scan through the PSMP frame to identify the second STA-info field by finding a fifth field indicating an identification of the second apparatus,
determine a first value in the first STA-info field indicating a first start time for the transmission of said at least one data packet from the first apparatus and a second value in the second STA-info field indicating a second start time for the reception of said at least one data packet at the second apparatus being the same, and
determine a third value in the first STA-info field indicating time duration for the transmission of said at least one data packet from the first apparatus and a fourth value in the second STA-info field indicating time duration for the reception of said at least one data packet at the second apparatus being the same.

13. The first apparatus of claim 12, wherein:
the first STA-info field comprises a first sequence of bits indicating a first wireless channel for the first apparatus to use for communicating,
the second STA-info field comprises a second sequence of bits indicating a second wireless channel for the second apparatus to use for communicating, and
determining the second apparatus as a destination the second apparatus further comprises:
scanning through the PSMP frame to determine that the first wireless channel used by the first apparatus and the second wireless channel used by the second apparatus being the same.

14. The first apparatus of claim 9, further comprising: a low power circuit configured to operate in a sleep mode during another time period that does not overlap the first time period.

15. The first apparatus of claim 9, further comprising:
accessing a third wireless channel for a transmission other than the transmission of said at least one data packet, wherein the third wireless channel is a wireless channel not indicated in the PSMP frame.

16. The first apparatus of claim 15, wherein the accessing comprises contending in the third wireless channel.

17. A first apparatus for wireless communications, comprising:

means for receiving, at a first apparatus, a schedule for multiple communications between a plurality of apparatuses in a first station-information (STA-info) field and second station-information (STA-info) field of a Power Save Multi Poll (PSMP) frame, wherein the schedule comprises:

for a first apparatus among the plurality of apparatuses, within the first STA-info field:
a first field indicating a first time period to transmit at least one data packet,
a second field, separate from the first field, indicating an identification of the first apparatus, and
a third field, separate from the first and second fields, indicating that the first apparatus must communicate using peer-to-peer communication; and for a second apparatus different from the first apparatus, within the second STA-info field:
a fourth field, separate from the first, second and third fields, indicating a second time period to receive said at least one data packet;

means for scanning, by the first apparatus, through the PSMP frame to determine the first STA-info field associated with the first apparatus based on the second field;

means for determining, by the first apparatus and based on the third field, that the transmission of said at least one data packet is by peer-to-peer communication;

means for determining the second apparatus as a destination of the said at least one data packet based on (i) the third field and (ii) the first time period and the second time period being the same; and means for performing the transmission of said at least one data packet to the second apparatus.

18. The first apparatus of claim 17, wherein the peer-to-peer communications comprises a Direct Link Setup (DLS) communication.

19. The first apparatus of claim 17, wherein the PSMP frame comprises the IEEE 802.11n PSMP message.

20. The first apparatus of claim 17, wherein scanning through the PSMP frame comprises determining the identification of the first apparatus, wherein determining the second apparatus as the destination of said at least on data packet further comprises:

scanning through the PSMP frame to identify the second STA-info field by finding a fifth field indicating an identification of the second apparatus,
determining a first value in the first STA-info field indicating a first start time for the transmission of said at least one data packet from the first apparatus and a second value in the second STA-info field indicating a second start time for the reception of said at least one data packet at the second apparatus being the same, and
determining a third value in the first STA-info field indicating time duration for the transmission of said at least one data packet from the first apparatus and a fourth value in the second STA-info field indicating time duration for the reception of said at least one data packet at the second apparatus being the same.

21. The first apparatus of claim 20, wherein:
the first STA-info field comprises a first sequence of bits indicating a first wireless channel for the first apparatus to use for communicating,
the second STA-info field comprises a second sequence of bits indicating a second wireless channel for the second apparatus to use for communicating, and
means for determining the second apparatus as a destination the second apparatus further comprises:
means for scanning through the PSMP frame to determine that the first wireless channel used by the first apparatus and the second wireless channel used by the second apparatus being the same.

22. The first apparatus of claim 17, further comprising:
means for operating in a sleep mode during another time period that does not overlap the first time period.

23. The first apparatus of claim 17, further comprising:
means for accessing a third wireless channel for a transmission other than the transmission of said at least one data packet, wherein the third wireless channel is a wireless channel not indicated in the PSMP frame.

24. The first apparatus of claim 23, wherein the means for accessing comprises means for contending in the third wireless channel.

25. A non-transitory computer-readable medium having instructions stored thereon executable to:
receive, at a first apparatus, a schedule for multiple communications between a plurality of apparatuses in a first station-information (STA-info) field and second station-information (STA-info) field of a Power Save Multi Poll (PSMP) frame, wherein the schedule comprises:
for a first apparatus among the plurality of apparatuses, within the first STA-info field:
a first field indicating a first time period to transmit at least one data packet,
a second field, separate from the first field, indicating an identification of the first apparatus, and
a third field, separate from the first and second fields, indicating that the first apparatus must communicate using peer-to-peer communication; and
for a second apparatus different from the first apparatus, within the second STA-info field:
a fourth field, separate from the first, second and third fields, indicating a second time period to receive said at least one data packet;
scan, by the first apparatus, through the PSMP frame to determine the first STA-info field associated with the first apparatus based on the second field;
determine, by the first apparatus and based on the third field, that the transmission of said at least one data packet is by peer-to-peer communication;
determine the second apparatus as a destination of the said at least one data packet based on (i) the third field and (ii) the first time period and the second time period being the same; and
perform the transmission of said at least one data packet to the second apparatus.

26. A wireless node, comprising:
at least one antenna;
a receiver configured to receive, via the at least one antenna, a schedule for multiple communications between a plurality of wireless nodes in a first station-information (STA-info) field and second station-information (STA-info) field of a Power Save Multi Poll (PSMP) frame, wherein the schedule comprises:
for the wireless node among the plurality of wireless nodes, within the first STA-info field:
a first field indicating a first time period to transmit at least one data packet,
a second field, separate from the first field, indicating an identification of the wireless node, and
a third field, separate from the first and second fields, indicating that the wireless nodes must communicate using peer-to-peer communication; and
for another wireless node different from the wireless node, within the second STA-info field:
a fourth field, separate from the first, second and third fields, indicating a second time period to receive said at least one data packet;
a circuit configured to
scan, by the wireless node, through the PSMP frame to determine the first STA-info field associated with the wireless node based on the second field;
determine, by the wireless node and based on the third field, that the transmission of said at least one data packet is by peer-to-peer communication;
determine the other wireless node as a destination of the said at least one data packet based on (i) the third field and (ii) the first time period and the second time period being the same; and
a transceiver configured to perform the transmission, via the at least one antenna, of said at least one data packet to the other wireless node.

\* \* \* \* \*